(12) United States Patent
Cho

(10) Patent No.: US 10,243,228 B2
(45) Date of Patent: Mar. 26, 2019

(54) DEVICE AND METHOD FOR MANUFACTURING MEMBRANE-ELECTRODE ASSEMBLY OF FUEL CELL

(71) Applicant: HYUNDAI MOTOR COMPANY, Seoul (KR)

(72) Inventor: Su Hwan Cho, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 585 days.

(21) Appl. No.: 14/934,677

(22) Filed: Nov. 6, 2015

(65) Prior Publication Data

US 2017/0033384 A1 Feb. 2, 2017

(30) Foreign Application Priority Data

Jul. 29, 2015 (KR) .......................... 10-2015-0107528

(51) Int. Cl.
| | |
|---|---|
| *H01M 8/1004* | (2016.01) |
| *B32B 37/00* | (2006.01) |
| *B32B 38/18* | (2006.01) |
| *B32B 38/10* | (2006.01) |
| *B32B 41/00* | (2006.01) |

(52) U.S. Cl.
CPC ....... *H01M 8/1004* (2013.01); *B32B 37/0053* (2013.01); *B32B 37/025* (2013.01); *B32B 38/10* (2013.01); *B32B 38/1858* (2013.01); *B32B 41/00* (2013.01); *B32B 2041/04* (2013.01); *B32B 2457/18* (2013.01); *Y02P 70/56* (2015.11)

(58) Field of Classification Search
CPC .... H01M 8/1004; B32B 38/10; B32B 37/025; B32B 38/1858; B32B 37/0053; B32B 2041/04; B32B 2457/18; B32B 41/00; Y02P 70/56
USPC ....................................................... 429/535
See application file for complete search history.

(56) References Cited

U.S. PATENT DOCUMENTS

2008/0145712 A1* 6/2008 Pierpont ............... B32B 37/203
429/509

FOREIGN PATENT DOCUMENTS

| JP | 2010-176897 A | | 8/2010 |
|---|---|---|---|
| JP | 2010176897 A | * | 8/2010 |
| JP | 2015-022853 A | | 2/2015 |
| KR | 10-2008-0008855 A | | 1/2008 |

(Continued)

*Primary Examiner* — Gary D Harris
(74) *Attorney, Agent, or Firm* — Brinks Gilson & Lione

(57) ABSTRACT

A manufacturing device of a membrane-electrode assembly for a fuel cell bonds each of anode and cathode catalyst electrode layers continuously formed in upper and lower electrode films to upper and lower surfaces of an electrolyte membrane. The device includes: upper and lower bonding rolls respectively installed to upper and lower sides of a transport path of the electrolyte membrane and of the upper and lower electrode films, the bonding rolls pressing the catalyst electrode layers to the upper surface and the lower surface of the electrolyte membrane at a predetermined temperature to be transferred, and upper and lower adsorbents respectively disposed at the upper and lower sides of the transport path in an entry side of the upper and lower bonding rolls, installed to be reciprocally moved along the transport path, and selectively adsorbing the upper and lower electrode films.

7 Claims, 9 Drawing Sheets

(56) References Cited

FOREIGN PATENT DOCUMENTS

| | | |
|---|---|---|
| KR | 10-2009-0059819 A | 6/2009 |
| KR | 10-2010-0045788 A | 5/2010 |

* cited by examiner

DEVICE AND METHOD FOR MANUFACTURING MEMBRANE-ELECTRODE ASSEMBLY OF FUEL CELL

CROSS-REFERENCE TO RELATED APPLICATION

This application claims the benefit of Korean Patent Application No. 10-2015-0107528, filed on Jul. 29, 2015, which is incorporated herein by reference in its entirety.

FIELD

An exemplary embodiment of the present disclosure relates to a system for manufacturing parts of a fuel cell stack, and manufacturing a membrane-electrode assembly for a fuel cell.

BACKGROUND

The statements in this section merely provide background information related to the present disclosure and may not constitute prior art.

Fuel cells produce electricity through an electrochemical reaction between hydrogen and oxygen. Fuel cells may continuously generate electric power upon receiving a chemical reactant from the outside, even without a separate charging process.

A fuel cell may be formed by disposing separators (or bipolar plates) on both sides of a membrane-electrode assembly (MEA) intervening therebetween. A plurality of fuel cells may be continuously arranged to form a fuel cell stack.

Here, a membrane-electrode assembly that is an example of a core component of the fuel cell as a three-layer structure, includes an electrolytic membrane in which hydrogen ions transfer, an anode catalyst electrode layer formed on one surface of the electrolytic membrane, and a cathode catalyst electrode layer formed on the other surface of the electrolytic membrane. A direct coating method and a decal method are examples of a method of manufacturing the three-layer structure membrane-electrode assembly.

Among them, in the case of the decal method, an electrode film coated with each catalyst electrode layer is deposited on both surfaces of the electrolyte membrane, the catalyst electrode layer is transferred to both surfaces of the electrolyte membrane to be joined, and then the electrode film is removed, thereby manufacturing the membrane-electrode assembly of a three-layer structure.

That is, in the manufacturing process of the membrane-electrode assembly using the decal method, an electrode film of a roll type coated with each catalyst electrode layer and an electrolyte membrane of a roll type pass a bonding roll of high temperature and high pressure to be laminated (thermally compressed), and the electrode film is removed to manufacture the membrane-electrode assembly of the three-layer structure.

As described above, in the process of manufacturing the membrane-electrode assembly of the three-layer structure by the decal method using the roll laminating process, there are advantages in production with glass since a manufacturing speed may be improved.

However, in the decal method using the roll lamination process, in the state that the electrode film coated with each catalyst electrode layer on both sides of the electrolyte membrane interposed therebetween is positioned, since they pass between the bonding rolls of high temperature and high pressure and the catalyst electrode layer and the electrolyte membrane are laminated in the directions such that they contact each other, we have discovered that it is difficult to align the lamination positions of the anode catalyst electrode layer and the cathode catalyst electrode layer.

That is, the electrode film and the electrolyte membrane continuously pass between the bonding rolls of high temperature and high pressure that are pressed and the catalyst electrode layer is laminated on both surfaces of the electrolyte membrane, and in this roll laminating continuous process, we have discovered that it is difficult to correctly accord the lamination positions of the catalyst electrode layers by a feeding speed difference of the electrode film.

We have further discovered that the lamination positions of the anode catalyst electrode layer and the cathode catalyst electrode layer are difficult to align because a pitch between the catalyst electrode layers is not constant in the process of manufacturing the catalyst electrode layer of the continuous patterns by coating the catalyst slurry to the electrode film.

SUMMARY

The present disclosure provides a device and a method of a membrane-electrode assembly for a fuel cell for aligning a transfer position of the catalyst electrode layer through a simple configuration without a change of the bonding roll while continuously roll-laminating the catalyst electrode layer to both surfaces of the electrolyte membrane by the decal method.

A manufacturing device of a membrane-electrode assembly for a fuel cell bonding each of anode and cathode catalyst electrode layers continuously formed in upper and lower electrode films to upper and lower surfaces of an electrolyte membrane according to an exemplary embodiment of the present disclosure includes: upper and lower bonding rolls respectively installed to upper and lower sides of a transport path of the electrolyte membrane and the upper and lower electrode films and pressing the catalyst electrode layer to the upper surface and the lower surface of the electrolyte membrane at a predetermined temperature to be transferred; and upper and lower adsorbents respectively disposed at the upper and lower sides of the transport path in an entry side of the upper and lower bonding rolls, installed to be reciprocally moved along the transport path, and selectively adsorbing the upper and lower electrode films.

Upper and lower position sensors respectively installed at the upper and lower sides of the transport path in the entry side of the upper and lower adsorbents, sensing the position of the catalyst electrode layer of the upper and lower electrode films, and outputting a detection signal of the position to a controller may be further included.

The upper and lower adsorbents may be formed with air holes to vacuum-adsorb the upper and lower electrode films.

The upper and lower adsorbents may be formed with the air holes at the surface corresponding to the upper and lower electrode films and is made of a plate type case having a closed and sealed space inside.

The upper and lower adsorbents may be respectively connected to a vacuum pump.

The upper and lower adsorbents may be installed to a base frame to be reciprocally moved along the transport path.

The base frame may be provided with a driver installed to be respectively connected to the upper and lower adsorbents and reciprocally moving the upper and lower adsorbents along the transport path.

The driver may include a servo motor installed at the base frame, a lead screw connected to the servo motor, a moving block coupled to the upper and lower adsorbents and engaged to the lead screw, and a guide block installed at the base frame and reciprocally slide-moving the moving block along the transport path.

The controller may control the operation of the vacuum pump and the driver due to a detection signal transmitted from the upper and lower position sensors.

A manufacturing method of a membrane-electrode assembly for a fuel cell bonding each of anode and cathode catalyst electrode layers continuously formed in upper and lower electrode films to upper and lower surfaces of an electrolyte membrane according to another exemplary embodiment of the present disclosure includes: unwinding the electrolyte membrane of a roll shape to be supplied to a predetermined transport path; unwinding the upper and lower electrode films of the roll shape continuously coated with the anode and cathode catalyst electrode layers with a predetermined interval to be supplied to upper and lower sides of the electrolyte membrane; sensing a position of the catalyst electrode layer for the upper and lower electrode films through the upper and lower position sensors to output a detection signal thereof to the controller; operating a vacuum pump connected to any one among the upper and lower adsorbents and the driver, depending on the detection signal of the upper and lower position sensors through the controller; vacuum-adsorbing any one among the upper and lower electrode films through any one adsorbent and moving the adsorbent through the driver in the feed direction of the electrolyte membrane and the upper and lower electrode films to align the position of the catalyst electrode layer; and transferring the catalyst electrode layer of the upper and lower electrode films to the upper surface and the lower surface of the electrolyte membrane at a predetermined temperature while passing the electrolyte membrane and the upper and lower electrode films between the upper and lower bonding rolls.

The controller may calculate a position difference value of the catalyst electrode layer depending on a driving speed of the upper and lower electrode films with reference to a position sensing time difference of the upper and lower position sensors, and may apply an operation control signal to the vacuum pump connected to any one of the upper and lower adsorbents and the driver when the position difference value is not 0.

The controller may apply the operation control signal to the vacuum pump connected to any one of the upper and lower adsorbents and the driver with reference the detection signal of the upper and lower position sensors firstly sensing the position of the catalyst electrode layer of the upper and lower electrode films.

The controller may apply the operation control signal to the vacuum pump connected to the upper adsorbent and the driver if the detection signal of the lower position sensor is first received.

The upper adsorbent may vacuum-adsorb the upper electrode film by the vacuum pump, and the driver may move the upper adsorbent by a distance corresponding to the position difference value along the feed direction of the electrolyte membrane and the upper and lower electrode films.

The controller may apply the operation control signal to the vacuum pump to stop the operation of the vacuum pump when the position difference value is 0, and may apply the operation control signal to the driver to return the upper adsorbent to the predetermined initial position through the driver.

The controller may apply the operation control signal to the vacuum pump connected to the lower adsorbent and the driver if the detection signal of the upper position sensor is first received.

The lower adsorbent may vacuum-adsorb the lower electrode film by the vacuum pump, and the driver may move the lower adsorbent by the distance corresponding to the position difference value along the feed direction of the electrolyte membrane and the upper and lower electrode films.

The controller may apply the operation control signal to the vacuum pump to stop the operation of the vacuum pump when the position difference value is 0, and may apply the operation control signal to the driver to return the lower adsorbent through the driver to the predetermined initial position.

The upper and lower position sensors may photograph each catalyst electrode layer for the upper and lower electrode films, and output the data thereof to the controller.

The controller may analyze the vision data transmitted from the upper and lower position sensors to calculate a position difference value of the catalyst electrode layer for the upper and lower electrode films, and may apply the operation control signal to the vacuum pump connected to any one of the upper and lower adsorbents and the driver when the position difference value is not 0.

In an exemplary embodiments of the present disclosure, by forcedly transferring the upper and lower electrode films through the upper and lower adsorbents, without the position of the upper and lower bonding roll, the transfer position of the anode catalyst electrode layer and the cathode catalyst electrode layer for the electrolyte membrane are automatically aligned to manufacture the membrane-electrode assembly.

Accordingly, in an exemplary embodiment of the present disclosure, since the position deviation of the catalyst electrode layer depending on the driving speed difference of the upper and lower electrode films and the coating position distribution of the catalyst electrode layer may be corrected, the transfer uniformity of the catalyst electrode layer may be improved, a good quality of the membrane-electrode assembly may be obtained, and the productivity of the membrane-electrode assembly may be further improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 5:
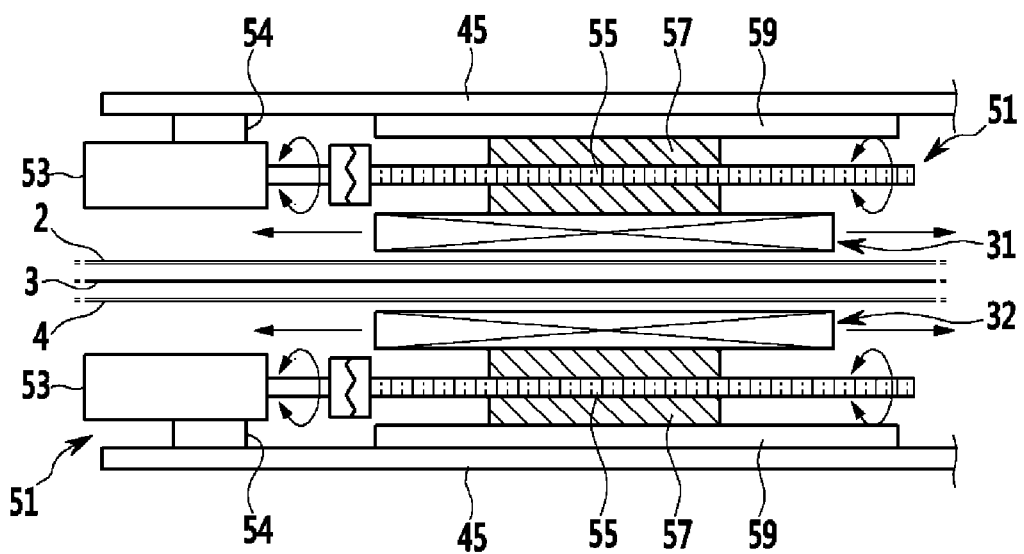

FIG. 5 is a view schematically showing a driver to move upper and lower adsorbents applied to a manufacturing device of a membrane-electrode assembly for a fuel cell according to an exemplary embodiment of the present disclosure; and FIG. 6 to FIG. 9 are views to explain a manufacturing method of a membrane-electrode assembly for a fuel cell according to an exemplary embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described embodiments may be modified in various different ways, all without departing from the spirit or scope of the present disclosure.

Further, in the drawings, a size and thickness of each element are arbitrarily represented for better understanding and ease of description, and the present disclosure is not limited thereto.

In a detailed description, in order to distinguish the same constituent elements, first, second, etc., are used in names of constituent elements and do not represent an order.

In addition, in the entire specification, unless explicitly described to the contrary, the word "comprise" and variations such as "comprises" or "comprising" will be understood to imply the inclusion of stated elements but not the exclusion of any other elements.

In addition, the terms "unit", "means", "portion", and "member" described in the specification indicate a unit of a comprehensive constituent element for performing at least one function or operation.

Figure 1:
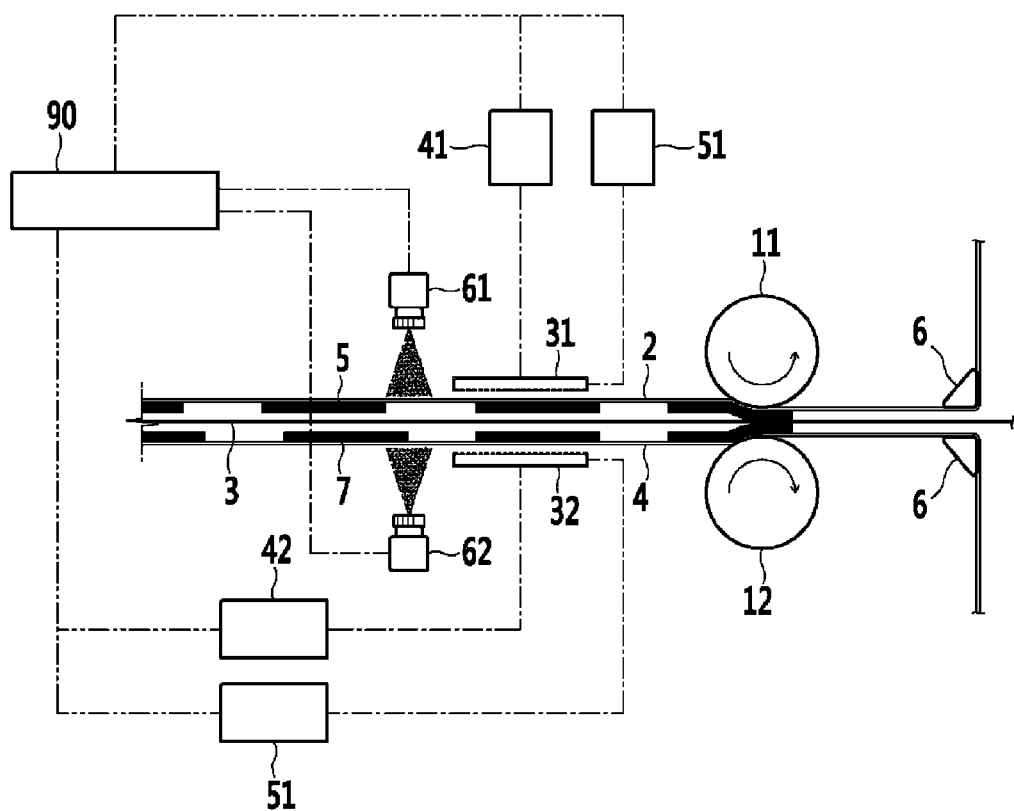
FIG. 1 is a view schematically showing a manufacturing device of a membrane-electrode assembly for a fuel cell according to an exemplary embodiment of the present disclosure.

FIG. 1 is a view schematically showing a manufacturing device of a membrane-electrode assembly for a fuel cell according to an exemplary embodiment of the present disclosure.

Referring to FIG. 1, a manufacturing device 100 of a membrane-electrode assembly for a fuel cell according to an exemplary embodiment of the present disclosure may be applied to an automation system for automatically and consecutively manufacturing parts of unit fuel cells that form a fuel cell stack.

Figure 2:
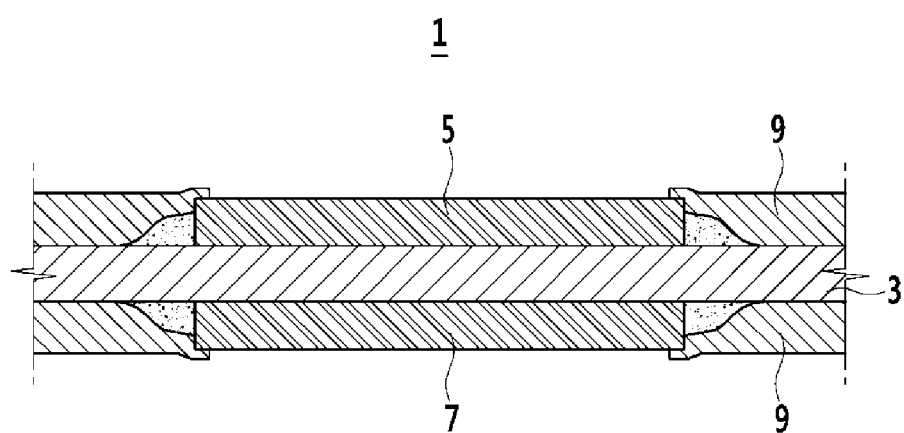
FIG. 2 is a view schematically showing a membrane-electrode assembly manufactured by an automatic system including a manufacturing device of a membrane-electrode assembly for a fuel cell according to an exemplary embodiment of the present disclosure.

The automatic system as shown in FIG. 2 is used to manufacture a membrane-electrode assembly 1 in which an anode catalyst electrode layer 5 is formed at one surface (an upper surface in a drawing) of an electrolyte membrane 3, a cathode catalyst electrode layer 7 is formed at the other surface (a lower surface in the drawing) of the electrolyte membrane 3, and a sub-gasket 9 is formed at each edge side of the catalyst electrode layers 5 and 7.

The automatic system automatically realizes an entire manufacturing process of a membrane-electrode assembly 1 up to a bonding process of an electrode membrane sheet in which the catalyst electrode layers 5 and 7 are bonded to respective surfaces of the electrolyte membrane 3 and formed of a roll shape, a bonding process of the membrane-electrode assembly sheet in which a sub-gasket 9 is bonded to the edge side of each catalyst electrode layer 5 and 7 of the electrode membrane sheet and formed of the roll shape, and a cutting process of the membrane-electrode assembly sheet.

For example, the automatic system may manufacture the electrode membrane sheet of the three-layer structure in which each film continuously coated with the anode catalyst electrode layer 5 and the cathode catalyst electrode layer 7 is deposited onto respective surfaces of the electrolyte membrane 3 and each catalyst electrode layer 5 and 7 is transferred and bonded to the respective surfaces of the electrolyte membrane 3 by the roll-laminating method.

The automatic system may manufacture the membrane-electrode assembly sheet in which the electrode membrane sheet and the sub-gasket 9 are bonded while passing between hot rollers in the state that the electrode membrane sheet wound in the roll shape is unwound, the sub-gasket 9 wound in the roll shape is unwound, and the sub-gasket 9 is positioned onto both surfaces of the electrode membrane sheet.

Also, the automatic system may unwind the membrane-electrode assembly sheet wound in the roll shape and cut the membrane-electrode assembly as a unit type including the catalyst electrode layers 5 and 7, thereby finally manufacturing the membrane-electrode assembly 1.

The manufacturing device 100 of the membrane-electrode assembly for the fuel cell according to an exemplary embodiment of the present disclosure applied to the automatic system is used to manufacture the electrode membrane sheet of the three-layer structure by the roll-laminating method and the decal method.

As shown in FIG. 1, the present device 100 may unwind the electrolyte membrane 3 wound in the roll shape, unwind upper and lower electrode films 2 and 4 on which the anode and cathode catalyst electrode layers 5 and 7 are continuously coated and wound in the roll shape, and may transfer the catalyst electrode layers 5 and 7 to the upper and lower surfaces of the electrolyte membrane 3, respectively, at a high temperature and high pressure by the roll-laminating method.

Here, the electrolyte membrane 3 is wound to an unwinder roller (not shown in the drawing) in the roll-shaped roll, is unwound from the unwinder roller, and is fed along a predetermined transport path. The upper and lower electrode films 2 and 4 are wound to the unwinder roller in the roll shape, are unwound from the unwinder roller, and are respectively fed to the side of the upper and lower surfaces of the electrolyte membrane 3 interposed therebetween.

Also, in the state that the catalyst electrode layers 5 and 7 are transferred onto the upper and lower surfaces of the electrolyte membrane 3, the upper and lower electrode films 2 and 4 are peeled by a release bar 6 and are wound to a rewinder roller (not shown in the drawing) in the roll shape. The electrode membrane sheet (not shown in the drawing) in which the catalyst electrode layers 5 and 7 are respectively bonded to the upper and lower surfaces of the electrolyte membrane 3 is wound to a rewinder roller (not shown in the drawing) in the roll shape.

The manufacturing device 100 of the membrane-electrode assembly for the fuel cell according to an exemplary embodiment of the present disclosure is formed of the structure in which the catalyst electrode layers 5 and 7 of the upper and lower electrode films 2 and 4 are continuously roll-laminated to the upper and lower surfaces of the electrolyte membrane 3 by the decal method and the transfer position of the catalyst electrode layer 5 and 7 are automatically aligned by the simple configuration.

For this, the manufacturing device 100 of the membrane-electrode assembly for the fuel cell according to an exemplary embodiment of the present disclosure includes upper and lower bonding rolls 11 and 12, upper and lower adsorbents 31 and 32, and upper and lower position sensors 61 and 62.

These constituent elements are configured in the main frame of the automatic system, and in this case, the main frame that is built in the upper and lower directions and supports each of the constituent elements may be configured by one frame or two or more partitioned frames.

The main frame may include various sub-elements to support the constituent elements of the manufacturing device 100 such as a bracket, a bar, a rod, a plate, a housing, a case, a block, and the like.

However, since the various sub-elements are to install the constituent elements of the manufacturing device 100, which will be described, to the main frame, the various sub-elements are generally referred to as the main frame in the exemplary embodiment of the present disclosure.

In an exemplary embodiment of the present disclosure, as described above, the upper and lower bonding rolls 11 and 12 are used to pass the electrolyte membrane 3 and the upper and lower electrode films 2 and 4 along the transport path, to press them at the predetermined temperature with the high pressure, and to transfer the catalyst electrode layers 5 and 7 of the upper and lower electrode films 2 and 4 to the upper and lower surfaces of the electrolyte membrane 3.

These upper and lower bonding rolls 11 and 12 are disposed at the upper and lower sides of the electrolyte membrane 3 and the transport path of the upper and lower electrode films 2 and 4, and are installed to the main frame by the motor (not shown in the drawing) to be rotatable.

The upper and lower bonding rolls 11 and 12 are rotated in opposite directions and function as bonding rollers while pressing the upper and lower electrode films 2 and 4 positioned at the upper and lower sides of the electrolyte membrane 3.

Figure 3:
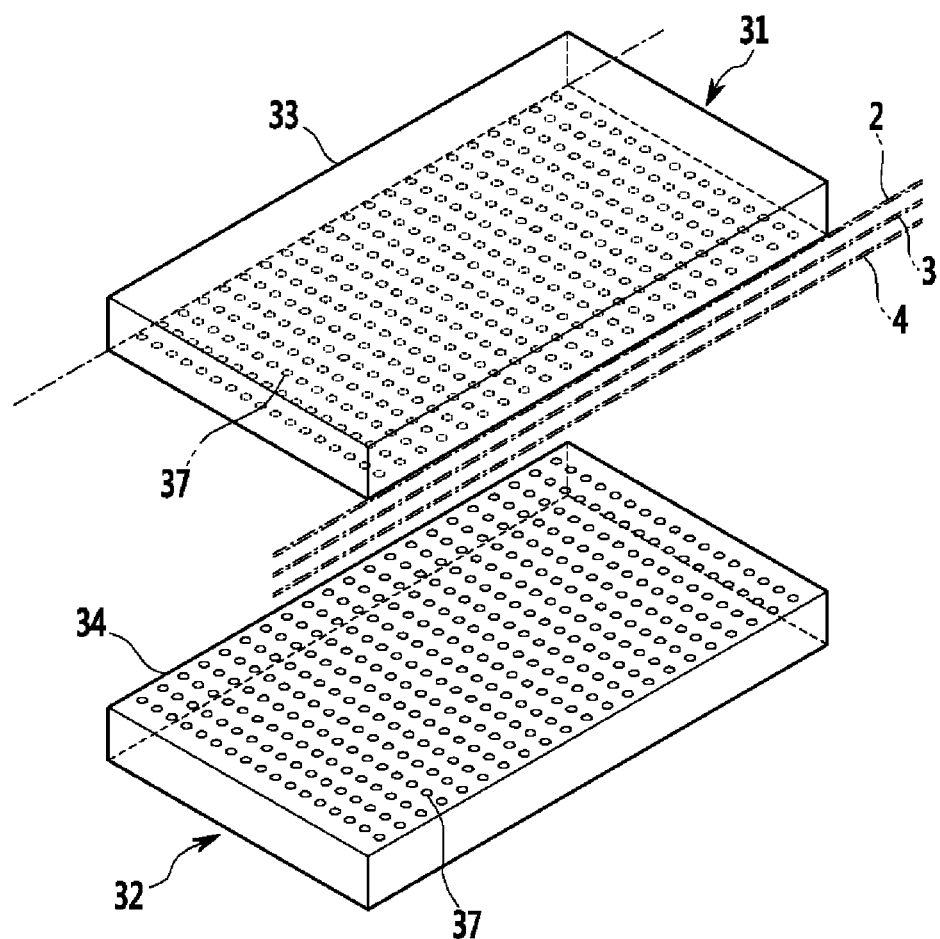
FIG. 3 is a perspective view of upper and lower adsorbents applied to a manufacturing device of a membrane-electrode assembly for a fuel cell according to an exemplary embodiment of the present disclosure.
Figure 4:
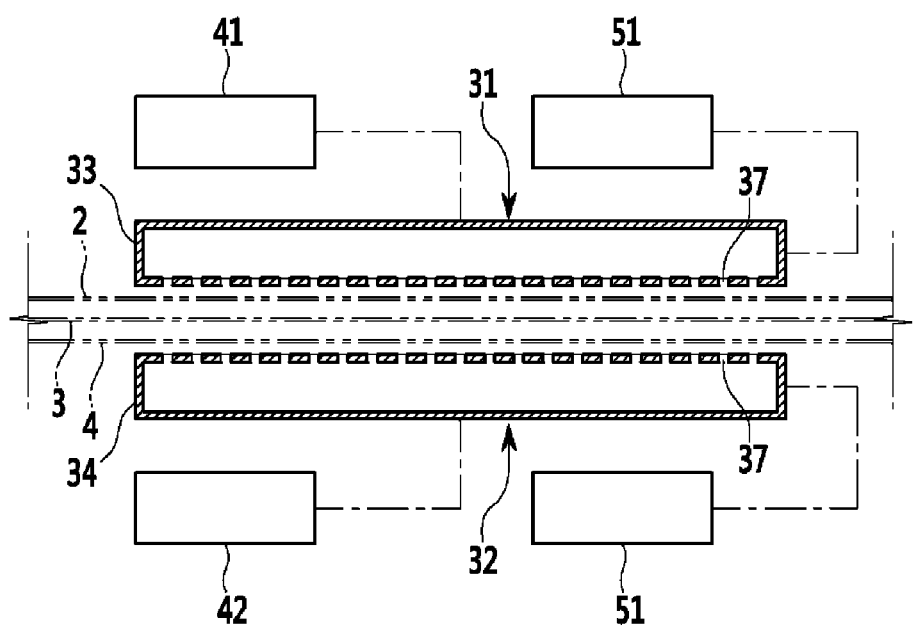
FIG. 4 is a cross-sectional schematic diagram of upper and lower adsorbents applied to a manufacturing device of a membrane-electrode assembly for a fuel cell according to an exemplary embodiment of the present disclosure.

FIG. 3 is a perspective view of upper and lower adsorbents applied to a manufacturing device of a membrane-electrode assembly for a fuel cell according to an exemplary embodiment of the present disclosure, and FIG. 4 is a cross-sectional schematic diagram of upper and lower adsorbents applied to a manufacturing device of a membrane-electrode assembly for a fuel cell according to an exemplary embodiment of the present disclosure.

Referring to FIG. 3 and FIG. 4 as well as FIG. 1, the upper and lower adsorbents 31 and 32 according to an exemplary embodiment of the present disclosure are used to selectively vacuum-adsorb the upper and lower electrode films 2 and 4 moving along the transport path.

The upper and lower adsorbents 31 and 32 are disposed at the upper and lower sides of the transport path of the electrolyte membrane 3 and the upper and lower electrode films 2 and 4 in the entry side of the upper and lower bonding rolls 11 and 12, and are installed to be reciprocally moved along the transport path thereof.

Here, the entry side of the upper and lower bonding rolls 11 and 12 is defined by a position before the electrolyte membrane 3, and the upper and lower electrode films 2 and 4 are transferred along the transport path and enter between the upper and lower bonding rolls 11 and 12.

The upper and lower adsorbents 31 and 32 vacuum-adsorb the upper and lower electrode films 2 and 4 by a vacuum absorption force, and for this, the upper and lower adsorbents 31 and 32 are formed with air holes 37 to vacuum-adsorb the upper and lower electrode films 2 and 4.

For example, the upper and lower adsorbents 31 and 32 are provided with square-plate-type cases 33 and 34 having a closed and sealed space. The square-plate-type cases 33 and 34 are formed with the air holes 37 in the surface corresponding to the upper and lower electrode films 2 and 4.

The upper and lower adsorbents 31 and 32 adsorb the air through the air holes 37, thereby vacuum-adsorbing the upper and lower electrode films 2 and 4 by the vacuum pressure of the air. For this, the upper and lower adsorbents 31 and 32 are connected to vacuum pumps 41 and 42, respectively. The vacuum pumps 41 and 42 apply the vacuum pressure to the inner space of the square-plate-type cases 33 and 34 for the upper and lower adsorbents 31 and 32.

These vacuum pumps 41 and 42 are formed as vacuum pumps that are well known in the art to which the present disclosure pertains to apply the vacuum pressure to the predetermined space, thus a detailed description thereof is omitted in the present specification.

Meanwhile, the upper and lower adsorbents 31 and 32 according to an exemplary embodiment of the present disclosure are installed to be reciprocally moved along the transport path of the electrolyte membrane 3 and the upper and lower electrode films 2 and 4 through a base frame 45 provided in the main frame, as shown in FIG. 5.

The base frame 45 is provided with a driver 51 installed to be respectively connected to the upper and lower adsorbents 31 and 32 and to reciprocally move the upper and lower adsorbents 31 and 32 along the transport path. The driver 51, as shown in FIG. 5, includes a servo motor 53, a lead screw 55, a moving block 57, and a guide block 59.

The servo motor 53 is installed to be fixed to the base frame 45 through a fixing block 54. The lead screw 55 is connected to the drive shaft of the servo motor 53.

The moving block 57 is coupled to the upper and lower adsorbents 31 and 32 and is engaged to the lead screw 55. The guide block 59 is installed to be fixed to the base frame 45. The moving block 57 is coupled to the guide block 59 to be reciprocally/slide-moved along the transport path of the electrolyte membrane 3 and the upper and lower electrode films 2 and 4.

Accordingly, in an exemplary embodiment of the present disclosure, the lead screw 55 is rotated in the forward direction through the servo motor 53, and the moving block 57 may be slide-moved along the guide block 59 along with the upper and lower adsorbents 31 and 32 in the feed direction of the electrolyte membrane 3 and the upper and lower electrode films 2 and 4.

Also, in an exemplary embodiment of the present disclosure, if the lead screw 55 is rotated in the reverse direction through the servo motor 53, the moving block 57 may be slide-moved along the guide block 59 along with the upper and lower adsorbents 31 and 32 in the direction opposite to the feed direction of the electrolyte membrane 3 and the upper and lower electrode films 2 and 4.

Referring to FIG. 1, the upper and lower position sensors 61 and 62 according to an exemplary embodiment of the present disclosure sense the positions of the catalyst electrode layers 5 and 7 of the upper and lower electrode films 2 and 4 transferred along the transport path along with the electrolyte membrane 3 and output the detection signal thereof to a controller 90.

The upper and lower position sensors 61 and 62 are respectively installed at the upper and lower sides of the transport path of the electrolyte membrane 3 and the upper and lower electrode films 2 and 4 in the entry sides of the upper and lower adsorbents 31 and 32. Here, the entry side of the upper and lower adsorbent 31 and 32 is defined by a position before the electrolyte membrane 3 and the upper and lower electrode films 2 and 4 are transferred along the transport path and enter between the upper and lower adsorbents 31 and 32.

The upper and lower position sensors 61 and 62 may sense the position of the sensing target by using an optical device such as ultrasonic waves, laser, infrared, etc., and may sense the position of the sensing target while photographing the sensing target.

These upper and lower position sensors 61 and 62 are formed as position sensors that sense the position of a sensing target by using the optical device or photographing the sensing target such that further detailed description of the configuration thereof is omitted in the present specification.

The controller 90 to control the overall operation of the present device 100, for example, due to the detection signal transmitted from the upper and lower position sensors 61 and 62, may control the operation of the vacuum pumps 41 and 42 to apply the vacuum pressure to the upper and lower adsorbents 31 and 32 and the operation of the driver 51 moving the upper and lower adsorbents 31 and 32.

For this, the controller 90 may be realized by at least one processor operated by a predetermined program, and the predetermined program may be programmed to perform a manufacturing method of the membrane-electrode assembly for the fuel cell according to an exemplary embodiment of the present disclosure.

The operation of the controller 90 due to the detection signal of the upper and lower position sensors 61 and 62 and the operation of the upper and lower adsorbents 31 and 32 by the controller 90 will be further described in detail through a manufacturing method of the membrane-electrode assembly of the fuel cell according to an exemplary embodiment of the present disclosure.

Hereafter, the manufacturing method of the membrane-electrode assembly of the fuel cell according to an exemplary embodiment of the present disclosure using the operation of the manufacturing device 100 of the membrane-electrode assembly for the fuel cell according to an exemplary embodiment of the present disclosure and the manufacturing device 100 will be described with reference to the above-disclosed drawings and accompanying drawings.

FIG. 6 to FIG. 9 are views to explain a manufacturing method of a membrane-electrode assembly for a fuel cell according to an exemplary embodiment of the present disclosure.

Figure 6:
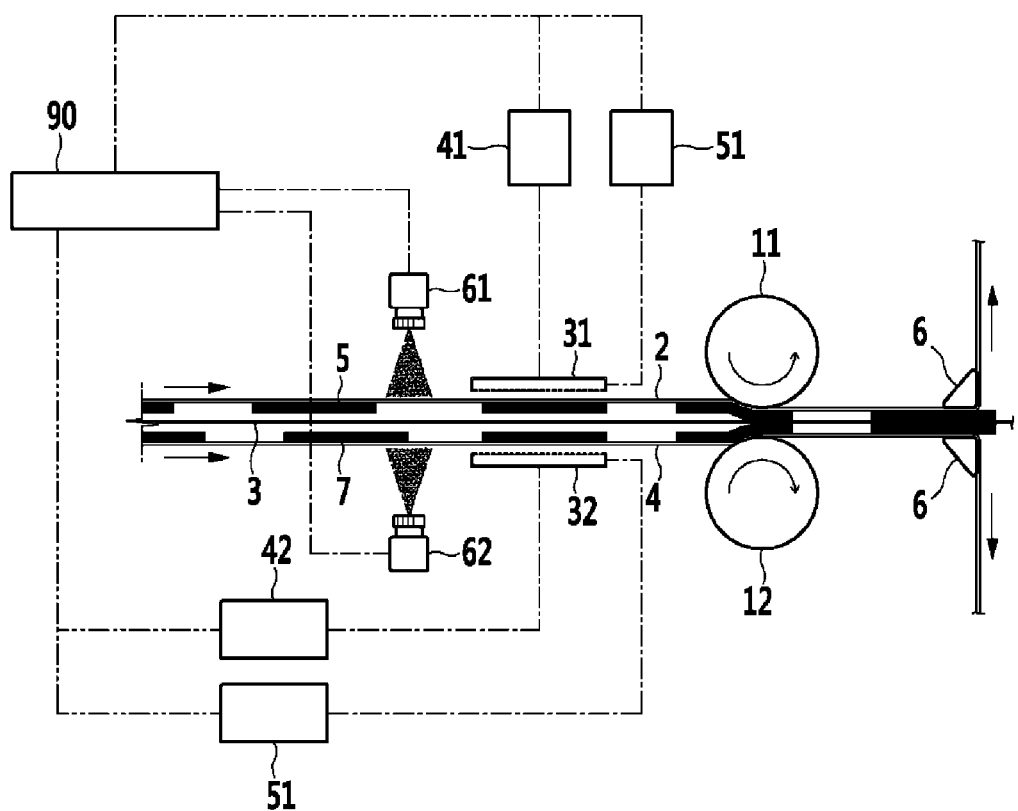

Referring to FIG. 6, firstly, in an exemplary embodiment of the present disclosure, as shown in FIG. 6, the electrolyte membrane 3 wound in the roll shape is unwound to be fed in the predetermined transport path, and the upper and lower electrode films 2 and 4 wound in the roll shape are unwound to be fed to the upper and lower surfaces of the electrolyte membrane 3, respectively.

In this case, the upper and lower electrode films 2 and 4 are respectively coated with the anode catalyst electrode layer 5 and the cathode catalyst electrode layer 7 corresponding to the upper and lower surfaces of the electrolyte membrane 3.

In this process, in an exemplary embodiment of the present disclosure, the position of the catalyst electrode layers 5 and 7 for the upper and lower electrode films 2 and 4 is sensed through the upper and lower position sensors 61 and 62, and the detection signal is output to the controller 90.

Thus, the controller 90 calculates a position difference value of the anode catalyst electrode layer 5 and the cathode catalyst electrode layer 7 depending on the driving speed of the upper and lower electrode films 2 and 4 with reference to a position sensing time difference of the upper and lower position sensors 61 and 62.

Here, if it is determined that the position difference value of the anode catalyst electrode layer 5 and the cathode catalyst electrode layer 7 is not 0, with reference to the detection signal of the upper and lower position sensors 61 and 62 firstly sensing the position of the catalyst electrode layers 5 and 7, the controller 90 applies the operation control signal to the vacuum pump 41 and 42 connected to one of the upper and lower adsorbent 31 and 32 and the driver 51.

For example, the controller 90 firstly receives the detection signal of the lower position sensor 62, and it is determined if the position difference value of the anode catalyst electrode layer 5 and the cathode catalyst electrode layer 7 is "a" that is not "0", the controller 90 applies the operation control signal to the vacuum pump 41 connected to the upper adsorbent 31 and the driver 51.

Figure 7:
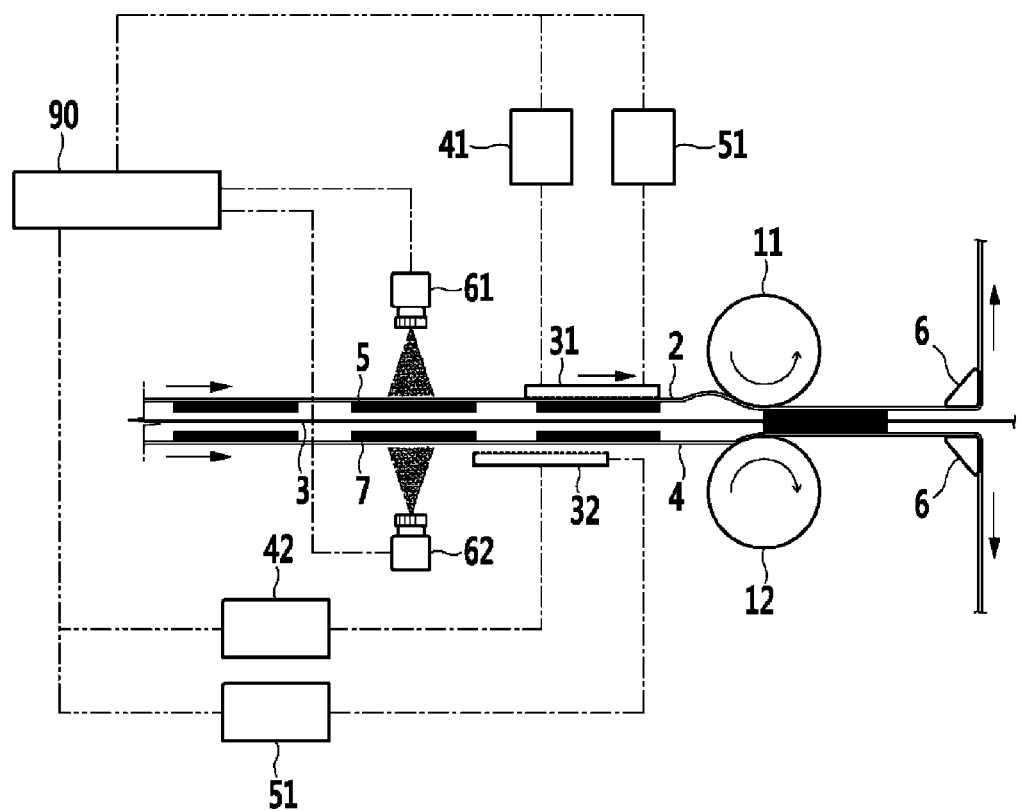

Accordingly, as shown in FIG. 7, the vacuum pump 41 is operated by the controller 90, and the vacuum pressure is applied to the inner space of the upper adsorbent 31. Thus, the upper adsorbent 31 adsorbs the air through the air holes 37 and the upper electrode film 2 is adsorbed by the vacuum absorption force of this air.

Simultaneously, the driver 51 is operated by the controller 90, and the upper adsorbent 31 is moved along the feed direction of the electrolyte membrane 3 and the upper and lower electrode films 2 and 4 by the distance corresponding to the position difference value a of the anode catalyst electrode layer 5 and the cathode catalyst electrode layer 7.

Here, the driver 51 operates the servo motor 53 through the controller 90, and if the lead screw 55 is rotated in the forward direction, the moving block 57 may be slide-moved along the guide block 59 in the feed direction of the electrolyte membrane 3 and the upper and lower electrode films 2 and 4, and the upper adsorbent 31 may be moved along the feed direction of the electrolyte membrane 3 and the upper and lower electrode films 2 and 4.

Accordingly, in the state that the upper adsorbent 31 vacuum-adsorbs the upper electrode film 2, the upper adsorbent 31 moves the upper electrode film 2 by the driver 51 along the feed direction of the electrolyte membrane 3 and the upper and lower electrode films 2 and 4 by the distance corresponding to the position difference value a of the anode catalyst electrode layer 5 and the cathode catalyst electrode layer 7.

In this process, if it is determined that the position difference value of the anode catalyst electrode layer 5 and the cathode catalyst electrode layer 7 due to the detection signal of the upper and lower position sensors 61 and 62 is "0", the controller 90 applies the operation control signal to the vacuum pump 41 to stop the operation of the vacuum pump 41. Thus, as the operation of the vacuum pump 41 is stopped, the upper electrode film 2 is free from the upper adsorbent 31.

Also, the controller 90 applies the operation control signal to the driver 51 to return the upper adsorbent 31 through the driver 51 to the predetermined initial position like in FIG. 6.

In this case, the driver 51 operates the servo motor 53 through the controller 90, and if the lead screw 55 is rotated in the reverse direction, the moving block 57 may be slide-moved along the guide block 59 in the feed opposite direction of the electrolyte membrane 3 and the upper and lower electrode films 2 and 4, and the upper adsorbent 31 may be moved in the initial position along the feed opposite direction of the electrolyte membrane 3 and the upper and lower electrode films 2 and 4.

Figure 8:
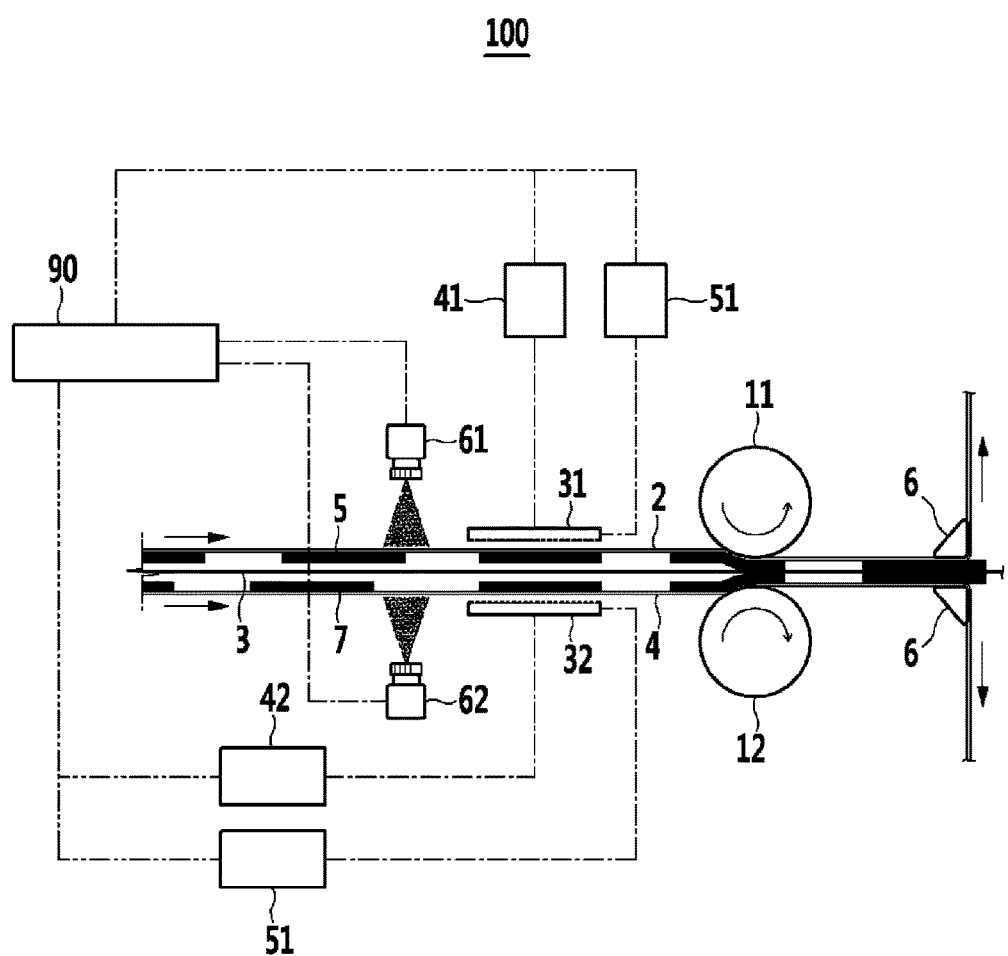

Meanwhile, as shown in FIG. 8, the controller 90 firstly receives the detection signal of the upper position sensor 61, and if it is determined that the position difference value of the anode catalyst electrode layer 5 and the cathode catalyst electrode layer 7 is "b" that is not 0, the controller 90 applies the operation control signal to the vacuum pump 42 connected to the lower adsorbent 32 and the driver 51.

Figure 9:
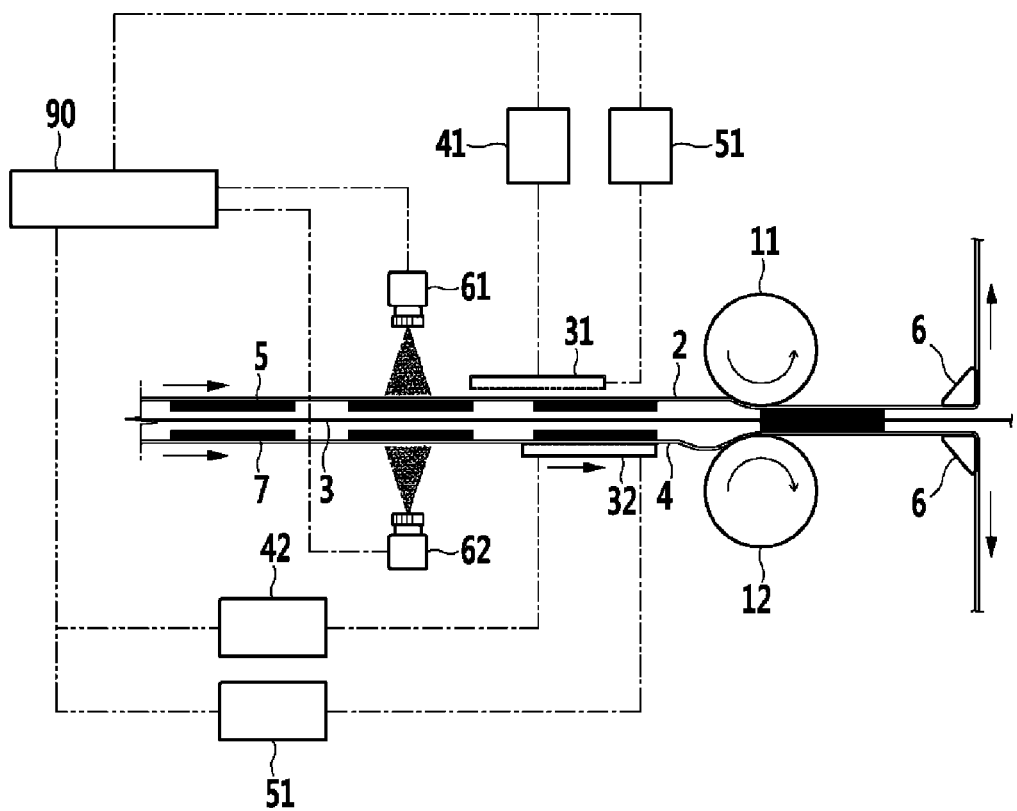

Accordingly, as shown in FIG. 9, the vacuum pump 42 is operated by the controller 90, and the vacuum pressure is applied to the inner space of the lower adsorbent 32. Thus, the lower adsorbent 32 adsorbs the air through the air holes 37 and the lower electrode film 4 is adsorbed by the vacuum absorption force of the air.

Simultaneously, the driver 51 is operated by the controller 90, and the lower adsorbent 32 is moved along the feed direction of the electrolyte membrane 3 and the upper and lower electrode films 2 and 4 by the distance corresponding to the position difference value b of the anode catalyst electrode layer 5 and the cathode catalyst electrode layer 7.

Here, the driver 51 operates the servo motor 53 through the controller 90, and if the lead screw 55 is rotated in the forward direction, the moving block 57 may be slide-moved along the guide block 59 in the feed direction of the electrolyte membrane 3 and the upper and lower electrode films 2 and 4, and the lower adsorbent 32 may be moved along the feed direction of the electrolyte membrane 3 and the upper and lower electrode films 2 and 4.

Accordingly, in the state that the lower adsorbent 32 vacuum-adsorbs the lower electrode film 4, the lower adsorbent 32 moves the lower electrode film 4 by the driver 51 along the feed direction of the electrolyte membrane 3 and the upper and lower electrode films 2 and 4 by the distance corresponding to the position difference value b of the anode catalyst electrode layer 5 and the cathode catalyst electrode layer 7.

In this process, if it is determined that the position difference value of the anode catalyst electrode layer 5 and the cathode catalyst electrode layer 7 due to the detection signal of the upper and lower position sensors 61 and 62 is 0, the controller 90 applies the operation control signal to the vacuum pump 42 to stop the operation of the vacuum pump 42. Thus, as the operation of the vacuum pump 42 is stopped, the lower electrode film 4 is free from the lower adsorbent 32.

Also, the controller 90 applies the operation control signal to the driver 51 to return the lower adsorbent 32 through the driver 51 in the predetermined initial position like in FIG. 8.

In this case, if the driver 51 operates the servo motor 53 through the controller 90 and the lead screw 55 is rotated in the reverse direction, the moving block 57 may be slide-moved along the guide block 59 in the feed opposite direction of the electrolyte membrane 3 and the upper and lower electrode films 2 and 4, and the lower adsorbent 32 may be moved to the initial position along the feed opposite direction of the electrolyte membrane 3 and the upper and lower electrode films 2 and 4.

Accordingly, in an exemplary embodiment of the present disclosure, in the process that the upper and lower electrode films 2 and 4 face each other via the electrolyte membrane 3 and are fed along the transport path along the electrolyte membrane 3, the anode catalyst electrode layer 5 and the cathode catalyst electrode layer 7 of the upper and lower electrode films 2 and 4 may be correctly matched due to the driving speed difference of the upper and lower electrode films 2 and 4.

Accordingly, in an exemplary embodiment of the present disclosure, the upper and lower electrode films 2 and 4 are vacuum-adsorbed through the upper and lower adsorbents 31 and 32 and the upper and lower adsorbents 31 and 32 may be moved in the feed direction of the electrolyte membrane 3 and the upper and lower electrode films 2 and 4.

Accordingly, in an exemplary embodiment of the present disclosure, by forcefully feeding the upper and lower electrode films 2 and 4 through the upper and lower adsorbents 31 and 32, the transfer position of the anode catalyst electrode layer 5 and the cathode catalyst electrode layer 7 for the electrolyte membrane 3 is aligned, and the anode catalyst electrode layer 5 and the cathode catalyst electrode layer 7 may be correctly matched.

On the other hand, in an exemplary embodiment of the present disclosure, in the process of continuously coating the anode catalyst electrode layer 5 and the cathode catalyst electrode layer 7 to the upper and lower electrode films 2 and 4, although the position deviation in which the pitch of the catalyst electrode layers 5 and 7 is not constant, the transfer position of the anode catalyst electrode layer 5 and the cathode catalyst electrode layer 7 may be automatically aligned through the above-described process.

As described above, in the state that the transfer position of the anode catalyst electrode layer 5 and the cathode catalyst electrode layer 7 is aligned, in an exemplary embodiment of the present disclosure, the electrolyte membrane 3 and the upper and lower electrode films 2 and 4 fed along the transport path enter between the upper and lower bonding rolls 11 and 12.

Thus, at the predetermined temperature, the upper and lower bonding rolls 11 and 12 are rotated in the directions opposite to each other and press the electrolyte membrane 3 and the upper and lower electrode films 2 and 4 in the high pressure, thereby the catalyst electrode layers 5 and 7 of the upper and lower electrode films 2 and 4 are respectively transferred to the upper and lower surfaces of the electrolyte membrane 3 to be bonded in the state that they are correctly matched.

In the above-described process, in an exemplary embodiment of the present disclosure, the controller 90 calculates the position difference value of the anode catalyst electrode layer 5 and the cathode catalyst electrode layer 7 depending on the driving speed of the upper and lower electrode films 2 and 4 with reference to the position sending time difference of the upper and lower position sensor 61 and 62, however it is not limited thereto.

In another form, the upper and lower position sensors 61 and 62 may photograph the anode catalyst electrode layer 5 and the cathode catalyst electrode layer 7 for the upper and lower electrode films 2 and 4 and may output the data thereof to the controller 90.

Thus, the controller 90 analyzes the data transmitted from the upper and lower position sensors 61 and 62 to calculate the position difference value of each anode catalyst electrode layer 5 and each cathode catalyst electrode layer 7 for the upper and lower electrode films 2 and 4.

Also, if it is determined that the position difference value of the anode catalyst electrode layer 5 and the cathode catalyst electrode layer 7 is not 0, the controller 90 may apply the operation control signal to the vacuum pump 41 and 42 connected to one of the upper and lower adsorbent 31 and 32 and the driver 51 with reference to any one catalyst electrode layer among the upper and lower electrode films 2 and 4 linearly driving along the driving speed of the upper and lower electrode films 2 and 4.

For example, if it is determined that the lower electrode film 4 is linearly driven and the position difference value of the anode catalyst electrode layer 5 and the cathode catalyst electrode layer 7 is not 0, the controller 90 may apply the operation control signal to the vacuum pump 41 connected to the upper adsorbent 31 and the driver 51.

Also, if it is determined that the upper electrode film 2 is linearly driven and the position difference value of the anode catalyst electrode layer 5 and the cathode catalyst electrode layer 7 is not 0, the controller 90 may apply the operation control signal to the vacuum pump 42 connected to the lower adsorbent 32 and the driver 51.

According to the manufacturing device 100 of the membrane-electrode assembly for the fuel cell according to an exemplary embodiment of the present disclosure and the manufacturing method thereof, without the change of the position of the upper and lower bonding rolls 11 and 12, the membrane-electrode assembly may be manufactured while automatically aligning the transfer position of the catalyst electrode layers 5 and 7 of the upper and lower electrode films 2 and 4.

Accordingly, in an exemplary embodiment of the present disclosure, the position deviation of the catalyst electrode layers 5 and 7 due to the driving speed difference of the upper and lower electrode films 2 and 4 and the coating position distribution of the catalyst electrode layers 5 and 7 may be corrected, the transfer uniformity of the catalyst electrode layers 5 and 7 may be improved and the good quality of the membrane-electrode assembly may be obtained, and the productivity of the membrane-electrode assembly may be further improved.

DESCRIPTION OF SYMBOLS

1 . . . membrane-electrode assembly
2, 4 . . . upper, lower electrode film
3 . . . electrolyte membrane
5 . . . anode catalyst electrode layer
6 . . . release bar
7 . . . cathode catalyst electrode layer
9 . . . sub-gasket
11, 12 . . . upper, lower bonding roll
31, 32 . . . upper, lower adsorbent
33, 34 . . . case
37 . . . air hole
41, 42 . . . vacuum pump
45 . . . base frame
51 . . . driver
53 . . . servo motor
54 . . . fixing block
55 . . . lead screw
57 . . . moving block
59 . . . guide block
61, 62 . . . upper, lower position sensor
90 . . . controller
100 . . . manufacturing device

What is claimed is:

1. A manufacturing device of a membrane-electrode assembly for a fuel cell bonding each of anode and cathode catalyst electrode layers continuously formed in upper and lower electrode films to upper and lower surfaces of an electrolyte membrane, said manufacturing device comprising:

upper and lower bonding rolls installed respectively to upper and lower sides of a transport path of the electrolyte membrane and of the upper and lower electrode films, and pressing the catalyst electrode layers to the upper surface and the lower surfaces of the electrolyte membrane at a predetermined temperature to be transferred;

upper and lower adsorbents disposed respectively at the upper and lower sides of the transport path in an entry side of the upper and lower bonding rolls, the upper and lower adsorbents being installed to be reciprocally moved along the transport path and configured to adsorb the upper and lower electrode films; and upper and lower position sensors respectively installed at the upper and lower sides of the transport path in an entry side of the upper and lower adsorbents, the upper and lower position sensors configured to sense a position of the catalyst electrode layers of the upper and lower electrode films, and configured to output a detection signal of the position of the catalyst electrode layers to a controller, wherein the controller operates at least one of the upper and lower absorbents configured to absorb at least one of the upper and lower electrode films and aligns the position of the catalyst electrode layers by moving the at least one of the upper and lower electrode films along the transport path by utilizing the at least one of the upper and lower absorbents.

2. The manufacturing device of claim 1, wherein
the upper and lower adsorbents are installed to a base frame to be reciprocally moved along the transport path, and
the base frame is provided with a driver installed to be respectively connected to the upper and lower adsorbents and reciprocally moving the upper and lower adsorbents along the transport path.

3. The manufacturing device of claim 2, wherein the driver comprises:
a servo motor installed at the base frame;
a lead screw connected to the servo motor;
a moving block coupled to the upper and lower adsorbents and engaged to the lead screw; and
a guide block installed at the base frame and reciprocally slide-moving the moving block along the transport path.

4. The manufacturing device of claim 2, wherein:
the upper and lower adsorbents are connected to a vacuum pump, respectively; and
the controller controls an operation of the vacuum pump and the driver based on a detection signal transmitted from the upper and lower position sensors.

5. The manufacturing device of claim 1, wherein
the upper and lower adsorbents are formed with air holes to vacuum-adsorb the upper and lower electrode films.

6. The manufacturing device of claim 5, wherein
the upper and lower adsorbents are formed with the air holes at a surface corresponding to the upper and lower electrode films and are made of a plate type case having a closed and sealed space inside.

7. The manufacturing device of claim 6, wherein
the upper and lower adsorbents are connected to a vacuum pump, respectively.

* * * * *